United States Patent [19]

Natkanski

[11] 3,828,811
[45] Aug. 13, 1974

[54] VALVE ASSEMBLY
[75] Inventor: Zygmunt Natkanski, Chicago, Ill.
[73] Assignee: Minnesota Mining and Manufacturing Company, St. Paul, Minn.
[22] Filed: May 31, 1973
[21] Appl. No.: 365,600

[52] U.S. Cl............. 137/556, 128/2.05 G, 251/304
[51] Int. Cl............................................ F16k 37/00
[58] Field of Search............. 137/556, 556.3, 556.6; 251/208, 304; 48/180 M; 128/2.05 C, 2.05 G

[56] References Cited
UNITED STATES PATENTS

| 1,477,328 | 12/1923 | Dyson et al..................... 251/208 X |
| 2,572,950 | 10/1951 | Rider............................... 251/208 |
| 3,613,668 | 10/1971 | Beck et al...................... 128/2.05 G |

FOREIGN PATENTS OR APPLICATIONS

| 577,430 | 6/1924 | France............................... 251/304 |

Primary Examiner—Henry T. Klinksiek

[57] ABSTRACT

A valve assembly is provided for use in a sphygmomanometer and includes a housing provided with an elongated first air passageway and a second air passageway having one end thereof communicating with the first passageway and the second end thereof terminating at an exterior surface portion of the housing. A valve piece overlies the housing exterior surface and is mounted thereon for manual rotation through a predetermined sector, delimited by first and second positions of adjustment. Rotation of the valve piece is about an axis disposed transverse of the exterior surface portion. The valve piece is provided with a passageway which interconnects first and second surface portions. The valve piece first surface portion is in sliding sealing engagement with the housing surface portion. One of the engaging surface portions is provided with an elongated groove extending from the end of the passageway terminating at the one engaging surface portion. The cross-sectional size of the groove diminishes uniformly from a maximum at the passageway end to zero at the distal end of the groove. When the valve piece is at the first position of adjustment the housing second passageway and the valve piece passageway are aligned with one another. When the valve piece is at the second position of adjustment, the housing second passageway is closed off by the valve piece.

9 Claims, 10 Drawing Figures

PATENTED AUG 13 1974 3,828,811

PATENTED AUG 13 1974 3,828,811

VALVE ASSEMBLY

BACKGROUND OF THE INVENTION

To make accurate measurements with a sphygmomanometer, it is important that there be controlled release of the pressured air within the inflated cuff wrapped about the limb of the patient. Various manually controlled valves have heretofore been provided for use in such instruments; however, because of certain design characteristics they have been beset with one or more of the following shortcomings: (a) they were of complex and costly construction; (b) it was extremely difficult to prevent air leakage through the valve; (c) it was awkward to manually manipulate; (d) the components of the valve were susceptible to becoming fouled or knocked out of adjustment; and (e) the indicator, which formed a part of the measuring gauge used in combination with the valve, was subjected to severe movement caused by pulsating air flow when the cuff was being inflated and thus was susceptible to an inordinate amount of wear and maintenance.

SUMMARY OF THE INVENTION

Thus, it is an object of the invention to provide a valve assembly for a sphygmomanometer which is not beset with any of the aforenoted shortcomings.

It is a further object of the invention to provide a valve assembly for a sphygmomanometer which may be readily manipulated manually so as to provide controlled release of the pressured air inflating the cuff and thus, enable more accurate measurements to be made.

It is a still further object of the invention to provide a compact unitary control valve assembly including the measuring gauge therefor which may be readily held in the hand of the person utilizing a sphygmomanometer.

It is a still further object of the invention to provide a control valve assembly for use in sphygmomanometer wherein the movement of the pressure responsive indicator of the gauge therefor is not adversely affected by pulsating air flow when the cuff is being inflated.

Further and additional objects will appear from the description, accompanying drawings and appended claims.

In accordance with one embodiment of the invention, a valve assembly for use in a sphygmomanometer is provided which includes a housing having first and second passageways formed therein. The second passageway has one end thereof terminating at an exterior surface portion of the housing. A manually adjustable valve piece overlies the exterior surface portion and is adapted to be moved through a predetermined sector about an axis transversely disposed with respect to the housing exterior surface portion. The valve piece is provided with first and second surface portions which are interconnected by a passageway. The valve piece first surface portion is maintained in sliding, sealing engagement with the housing exterior surface portion. An elongated groove is formed in one of the engaging surfaces and extends from the end of passageway terminating at the surface portion. The crosssectional size of the groove diminishes uniformly from a maximum at the passageway end to zero at the distal end of the groove. When the valve piece is disposed at a first position of adjustment, the passageway in the valve piece is aligned with the second passageway in the housing. When in a second position of adjustment, the housing second passageway is closed off by the valve piece. The groove is in communication with the housing second passageway and the valve piece passageway when the valve piece assumes positions of adjustment intermediate said first and second positions.

DESCRIPTION

For a more complete understanding of the invention, reference should be made to the drawings wherein.

Figure 1:
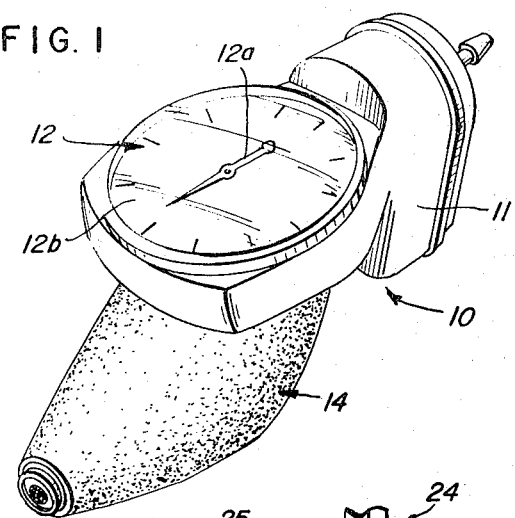
FIGS. 1 and 2 are perspective views, top and bottom, respectively, of one form of a valve assembly adapted for use in a sphygmomanometer.
Figure 2:
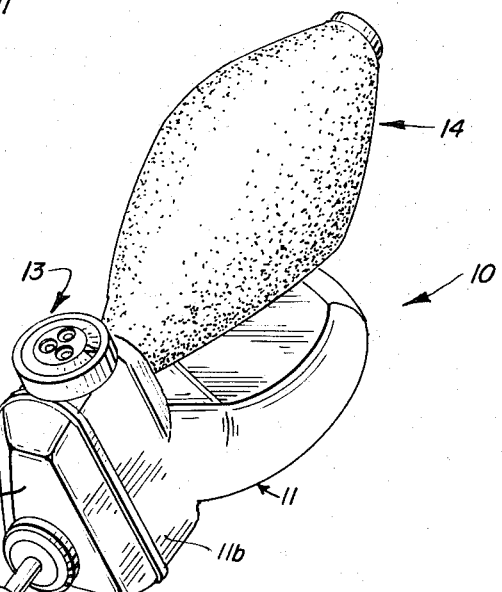

Referring now to the drawings and more particularly to FIGS. 1 and 2, a valve assembly 10 is shown which is adapted for use in a sphygmomanometer, not shown. The assembly includes a housing 11, preferably molded of metal, plastic or the like; a gauge 12 mounted on the housing; a manually adjustable valve 13 carried on the housing; and a squeezable bulb 14 used to inflate the cuff, not shown, which is adapted to be wrapped about a limb at the time the patient's blood pressure is to be measured.

Figure 3A:
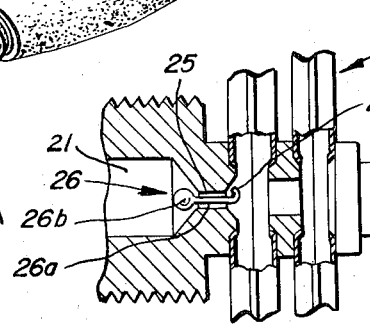
FIG. 3A is an enlarged fragmentary vertical sectional view of a portion of FIG. 3.
Figure 3:
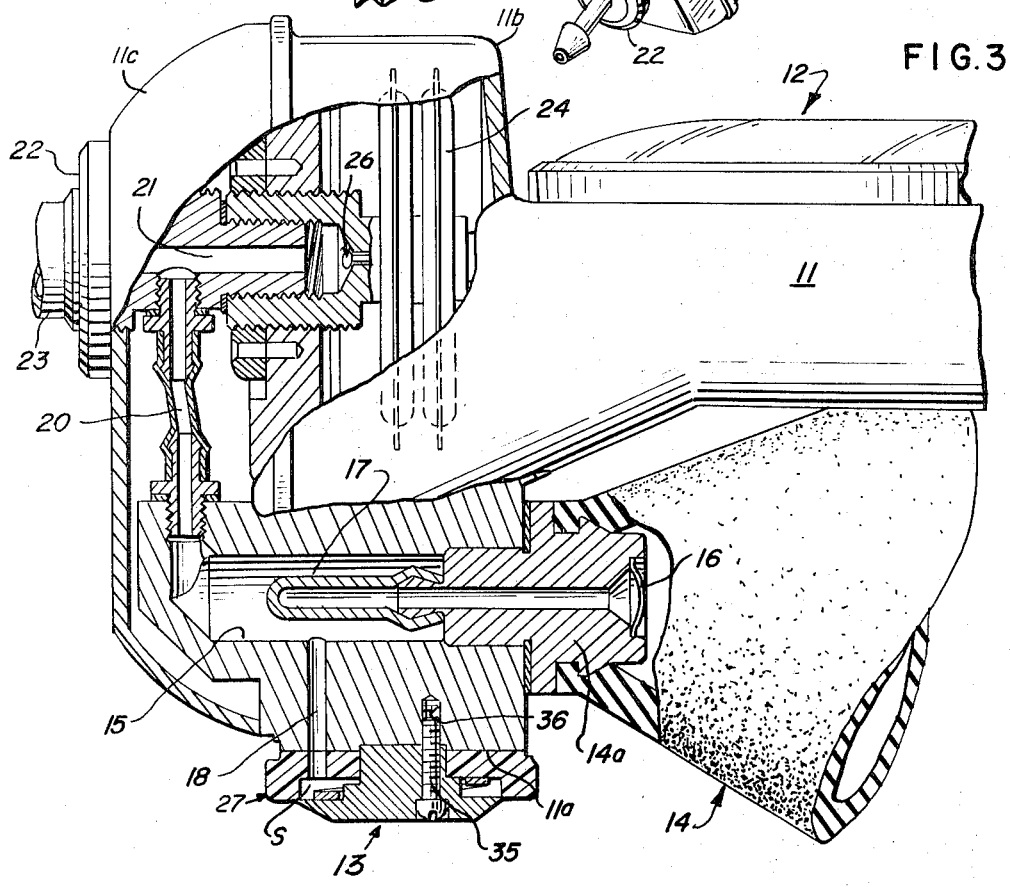
FIG. 3 is an enlarged fragmentary side elevational view of the assembly of FIG. 1 with portions thereof in vertical section.

As seen in FIG. 3, housing 11 is provided with an elongated first passageway 15, one end of which is engaged by a connector 14a carried by the discharge end of the bulb. The connector 14a includes a one-way valve 16 permitting air flow only in one direction into the passageway 15, and a filter piece 17 disposed within the passageway. A second passageway 18 is formed in housing 11 and has one end thereof communicating with passageway 15 and the other end terminating at an exterior surface portion 11a of the housing. A third passageway 20 is provided which may have a flexible portion. Passageway 20 has one end thereof communicating with the opposite end of passageway 15. The second end of passageway 20 terminates at a fourth passageway 21 provided within the housing. A hose connector 22 is affixed to one end of passageway 21 and is adapted to accommodate a flexible hose 23, see FIG. 3, which leads to the cuff, not shown. The opposite end of passageway 21 communicates with an end of a bellows-type unit 24 which is a component of gauge 12. The unit 24 permits a rotatably mounted indicator 12a to be responsive to the air pressure generated within passageway 21 and thus, rotate relative to an exposed calibrated dial 12b mounted on the exterior of the housing 11, see FIG. 1.

The unit 24 is provided with a narrow opening 25, which communicates with passageway 21, see FIGS. 3 and 3A. Loosely positioned within opening 25 is a dampening element 26, which in the illustrated embodiment has an elongated rod or wirelike central portion 26a having a diameter less than the diameter of opening 25. The opposite ends 26b of the element 26 are swagged or enlarged so as to prevent the element from becoming disassembled from the opening when pressured air flows through the opening 25. Because of the restrictive character of the element 26 within the opening 25, the pulsating flow of air through the bellows unit 24 is eliminated thus preventing abrupt, oscillating movement of the indicator 12a, when the cuff is being inflated by manual squeezing of the bulb 14. By eliminating the abrupt, oscillating movement of the indicator, maintenance of the various components comprising the bellows unit 24 and the indicator 12a has been reduced to a minimum. Furthermore, the indicator 12a may be made more sensitive thereby enabling more accurate readings to be taken when the sphygmomanometer is being used.

The valve 13, as seen in FIGS. 2 and 3, is located adjacent the forward end of the housing and is in close proximity to the bulb connector 14a. The valve 13 includes a disc-shaped valve piece 27 having a flat inner surface portion 27a which is substantially coincident to the housing exterior surface portion 11a. The surface portions 11a and 27a are contoured so that a sliding sealing engagement is maintained between them in a manner to be hereinafter described.

The outer surface portion 27b of the valve piece 27 is substantially flat and the two surface portions 27a and b are interconnected by a large, centrally disposed opening 27c and a small opening 27d offset from opening 27c. The two surface portions are delimited by an annular rim 28. The outer peripheral surface of the rim may be knurled or roughened so as to facilitate manual rotating of the valve piece. The outer exposed surface of the rim 28 may be provided with calibrated indicia I.

Figure 4:
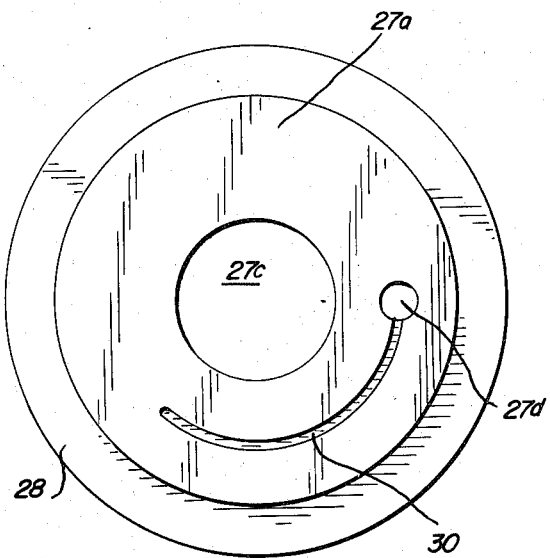
FIG. 4 is an enlarged view of the valve piece showing the inner or first surface portion thereof.

It will be noted in FIG. 4, that surface portion 27a of the valve piece is provided with an elongated arcuate groove 30 which has one end thereof terminating at opening 27d. The depth or cross-sectional size of the groove 30 diminishes uniformly from a maximum at opening 27d to zero at the distal end. The center of curvature of the groove is preferably coincident to the axis of opening 27c.

In lieu of the groove 30 being formed in surface portion 27a, it may in certain instances be formed in the housing exterior surface portion 11a, with the end of the groove having the greatest depth or cross-section terminating at the second passageway 18 formed in the housing 11.

The valve piece 27 is adapted to be manually moved only through a predetermined sector (e.g. approximately 180°). When the valve piece is disposed at one terminal position of adjustment, the small opening 27d is aligned with the end of passageway 18 thereby causing any air pressure within passageway 21 to be rapidly exhausted to the atmosphere and resulting in relaxing of the cuff encompassing the limb. When the valve piece, however, assumes the opposite terminal position of adjustment, the end of passageway 18 is completely closed off by the valve piece surface portion 27a. When this latter condition occurs, the cuff-inflating air pressure within passageway 21 is not diminished. The rate at which the air pressure within passageway 21 is exhausted to the atmosphere will depend upon the setting of the valve piece between the two terminal positions, aforedescribed.

Figure 6:
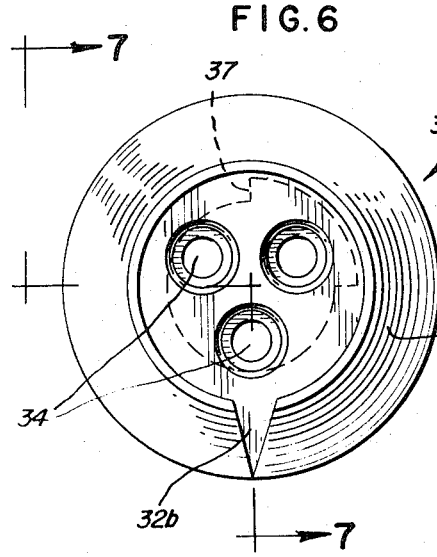
FIG. 6 is an enlarged top plan view of the valve piece-retaining member shown in FIG. 2.
Figure 7:
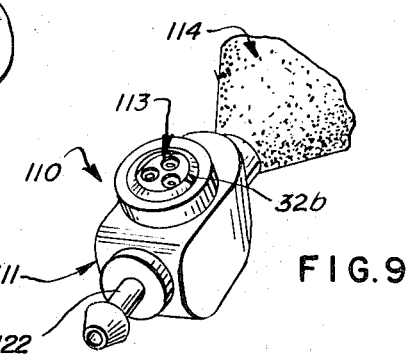
FIG. 7 is an enlarged side elevational view of the member of FIG. 6 and with a portion thereof in vertical section.

The valve piece 27 is retained in assembled relation on the housing exterior by a retainer member 31, see FIGS. 6 and 7. The retainer member has an enlarged annular end section 32 which is sized to substantially coincide with the area delimited by the rim 28 of the valve piece 27, see FIG. 3. Extending transversely from the concealed surface of end section 32 is a shank section 33 which slidably fits in the enlarged opening 27c formed in the valve piece. The end of the shank section abuts the exterior surface portion 11a of the housing. The surface portion 11a may be provided with a slight depression which is adapted to accommodate the shank section end. Symmetrically arranged about the axis of the member 31 are a plurality of elongated openings 34 which are adapted to receive screw fasteners 35. The fasteners are threaded into suitable openings 36 formed in the housing exterior and secure the member in a fixed position on the housing. The length of the shank section 33 is such that the concealed surface 32a of the end section 32 will be spaced a predetermined distance from the housing surface portion 11a. Formed on the end section surface 32a and adjacent the shank section 33 is a first stop element 37 which constitutes a segment of a circle; in the illustrated embodiment the segment is approximately 90°. The element 37 projects into the space S formed between the concealed surface 32a of the end section 32 and the outer surface portion 27b of the valve piece 27. The stop element 37 is adapted to engage a complemental stop element 38 formed on surface portion 27b of the valve piece. In the illustrated embodiment, the stop element 38 constitutes a segment of a circle of approximately 90°. Thus, the two stop elements 37 and 38 restrict the relative movement of the valve piece 27 to within a sector of approximately 180°.

Figure 8:
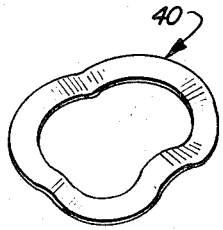
FIG. 8 is a perspective view of one form of a biasing spring used to retain the valve piece in a sliding sealing engagement with an exterior surface portion of the housing as seen in FIG. 3.

As aforementioned, the surface portion 27a of the valve piece 27 is maintained in a sliding sealing engagement with the exterior surface portion 11a of the housing 11. To maintain this engagement a ring-type spring 40, see FIG. 8, may be utilized. The inner diameter of the spring is such that it will readily encompass the shank section 33 and the stop element 37 of the member 31. The spring 40 may be formed of a suitable metal and have an undulating configuration.

Figure 5:
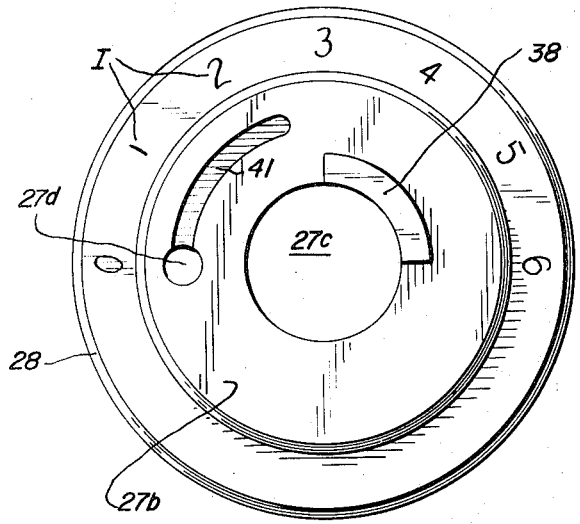
FIG. 5 is similar to FIG. 4 but showing the outer or second surface of the valve piece.

To prevent the spring from inadvertently closing off the smaller opening 27d in the valve piece, an elongated arcuate groove 41 may be formed in surface portion 27b, see FIG. 5. One end of the groove terminates at the opening 27d. The groove is preferably of uniform cross-section throughout.

It will be noted in FIG. 6 that the exposed surface of member 31 is provided with an embossed pointer-shaped indicator 32b. If desired, the indicator 32b may be debossed or painted on the surface, or in some instance may be eliminated. The indicator 32b is adapted to cooperate with the indicia I provided on the upper surface of the valve piece rim 28 to enable oe to readily observe the relative position of the small opening 27d of the valve piece with respect to the end of passageway 18.

To facilitate servicing the valve assembly and the gauge thereof, the housing 11 may be formed into two mating sections 11b and 11c which may be separated when desired so as to expose various components disposed within the housing interior. The configuration of the gauge and valve components and the housing may be varied from that shown without departing from the scope of the invention.

Figure 9:
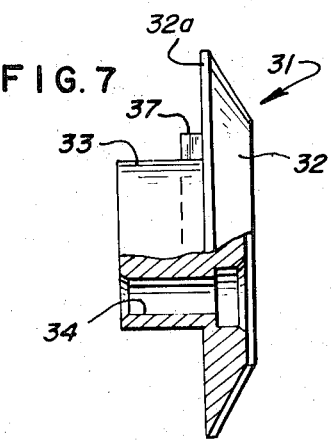
FIG. 9 is a fragmentary perspective view of a modified form of the valve assembly.

In FIG. 9 a modified form of valve assembly 110 is shown wherein the housing 111 includes first and second passageways arranged in a manner as seen in FIG. 3. The hose to the cuff, not shown, is secured to a connector 122 which in turn is mounted on the exterior of the housing 111 opposite the squeezable bulb 114. Mounted on housing 111 is the valve 113 which embodies the same components as described with regard to valve 13. In assembly 110, the gauge 12 is a separate unit and is not integral with respect to the housing 111. Aside from this structural difference, the valve assemblies 10 and 110 operate in similar manner.

Thus, it will be seen that a valve assembly has been provided which is of compact sturdy construction, easy to manipulate, permits accurate control of the valve to facilitate taking measurements, and dampens movement of the gauge indicator when there is pulsating air flow through portions of the assembly.

I claim:

1. A valve assembly for use in a sphygmomanometer to permit controlled release of pneumatic pressure accumulated within the sphygmomanometer, said assembly comprising a housing provided with a first air passageway in which a predetermined amount of pneumatic pressure is accumulated, said first air passageway being in communication with a pneumatically responsive pressure gauge, and a second air passageway having one end thereof communicating with said first passageway and a second end terminating at an exterior surface portion of said housing; a valve piece rotatably mounted on said housing surface portion for controlled manual adjustment through a predetermined sector about an axis disposed substantially transverse to said housing surface portion, said valve piece having first and second surface portions interconnected by a passageway offset from said axis, the end of the latter passageway terminating at the second surface portion being in continuous communication with the exterior of the sphygmomanometer, said valve piece first surface portion being in sliding, sealing engagement with said housing surface portion, one engaging surface portion being provided with an elongated arcuate groove extending from the passageway end formed in said surface portion, the center of curvature of said groove being coincident to said axis, the lateral and depth dimensions of said groove diminishing uniformly from a maximum at said passageway end to a minimum at the distal end of said groove, said valve piece, when in a first terminal position of adjustment, having the passageway thereof aligned with the end of the second passageway of said housing whereby maximum release occurs of the pneumatic pressure accumulated within the1 housing first air passageway and, when in a second terminal position of adjustment, having said second passageway end closed off by said valve piece first surface portion, said groove being in simultaneous communication with the passageways of said engaging surface portions upon said valve piece assuming selected positions of adjustment intermediate said terminal positions thereby controlling the rate of release of the pneumatic pressure accumulated in the housing first air passageway; and means engaging said housing for retaining said valve piece on said housing surface portion.

2. The valve assembly of claim 1 wherein said valve piece is provided with an opening aligned with said valve piece axis; and said valve piece-retaining means includes an exposed outer section overlying in spaced relation said valve piece second surface portion, an inner section projecting from said outer section and slidably extending through said valve piece opening and being secured to said housing exterior surface portion, and biasing means interposed and resiliently engaging said outer section and said valve piece second surface portion and urging said valve piece first surface portion into sliding sealing engagement with said housing exterior surface portion.

3. The valve assembly of claim 2 wherein said valve piece second surface portion is provided with a first stop means spaced from the passageway of said valve piece; and said valve piece-retaining means is provided with complemental second stop means, said first and second stop means cooperating with one another to restrict movement of said valve piece to within said predetermined sector.

4. The valve assembly of claim 2 wherein the second surface portion of said valve piece is provided with said elongated arcuate groove.

5. The valve assembly of claim 4 wherein the outer periphery of said valve piece second surface portion is provided with annularly spaced first indicia in partially encircling relation with respect to said valve piece axis, and the outer section of said valve piece-retaining means is provided with a complemental second indicia, the relative positions of said first and second indicia corresponding to the relative position of said valve piece passageway with respect to the second end of the second air passageway formed in said housing.

6. The valve assembly of claim 5 wherein the first indicia of said valve piece is disposed on a raised rim encircling the second surface portion of said valve piece.

7. The valve assembly of claim 1 wherein the exterior surface portion of said housing and the first surface portion of said valve piece are flat and substantially coincident.

8. A valve assembly for use in a sphygmomanometer comprising a housing provided with an elongated first air passageway, a second air passageway having one end thereof communicating with said first passageway and a second end thereof terminating at an exterior surface portion of said housing, and a third air passageway having one end thereof communicating with said first passageway and spaced from said second passageway; gauge means connected to the opposite end of said third air passageway, said gauge means including a movable element responsive to the air pressure within said first passageway; means adjustably mounted within said third passageway for dampening pulsating air flow therethrough; and manually adjustable valve means mounted on said housing exterior surface portion, said valve means including a valve piece having an inner surface portion is sliding, sealing engagement with the housing exterior surface portion, said valve piece being provided with a passageway connecting said inner surface with an outer surface, said valve piece being manually adjustable relative to the housing exterior surface portion between a first position wherein the passageway of said valve piece is aligned with said housing second passageway, and a second position wherein the end of the housing second passageway is closed off by said valve piece inner surface portion.

9. The valve assembly of claim 8 wherein the means adjustably mounted within the housing third passageway includes an elongated rod, the exterior of which cooperates with the wall of said third passageway to form a restricted passage substantially smaller in cross-sectional size than said housing first passageway.

* * * * *